Patented Mar. 29, 1938

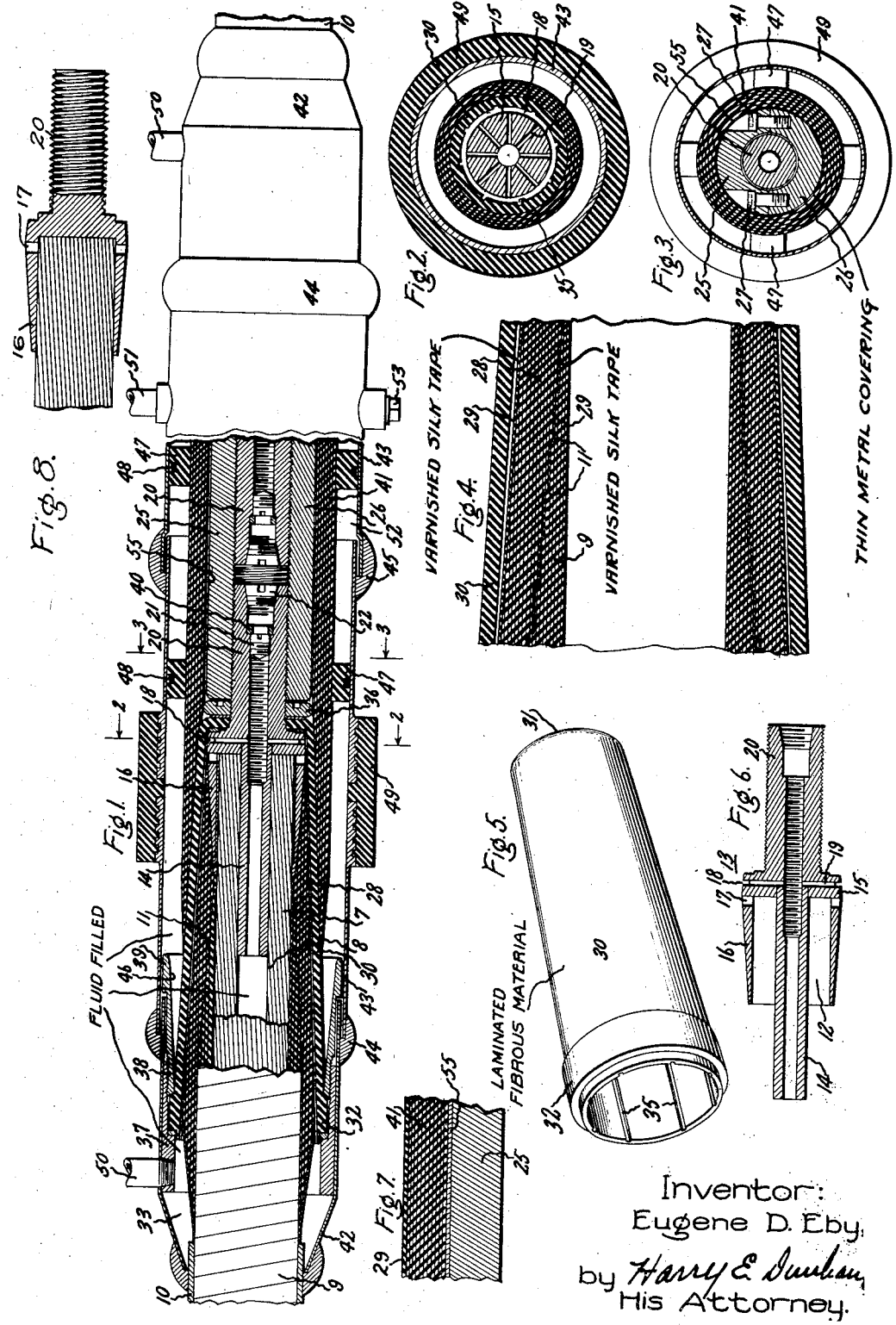

2,112,739

UNITED STATES PATENT OFFICE 2,112,739

STOP JOINT FOR FLUID FILLED CABLES

Eugene D. Eby, Pittsfield, Mass., assignor to General Electric Company, a corporation of New York Application February 24, 1936, Serial No. 65,309

11 Claims. (Cl. 173—268)

It is the practice in cable installations utilizing a liquid, such as degasified oil, for example, to improve the character of the fibrous insulation which is applied to the conductor, to provide stop joints at spaced intervals to limit the hydrostatic head due to liquid pressure as, for example, where the cable or a portion thereof is located on a slope, and also to segregate or divide the length of cable into sections so as to prevent draining of the entire cable or a large portion thereof in the event of a leak in any one of the connected reel lengths of which the cable is composed.

As heretofore constructed, these stop joints are relatively large and expensive and for that reason the number of such joints in a given installation is generally less than is desired from the viewpoint of segregation. Another controlling factor in most, if not all, cases is the size and spacing of the existing manholes in which the joints have to be located. In some cases, new manholes have to be constructed or old ones enlarged in order to afford the necessary space for the joints and the trained ends of the cables connected thereto. This is further complicated in an installation of single conductor cables operating three phase in that three such joints have to be located in the same manhole along with a considerable amount of other apparatus including liquid containing reservoirs for the cables.

Heretofore, these stop joints have required the use of large molded porcelain insulators which are expensive to manufacture, are relatively easily broken, and are relatively thick and consequently heavy. Being made of molded material which is afterwards fired at a high temperature, there is considerable loss due to warpage and breakage and to failure of the finished insulators to conform to the required dimensions. Because of the latter fact the insulators have to be made larger than would otherwise be necessary. They cannot be machined and the only permissible finishing operation is that of grinding certain small surfaces at the ends to render them reasonably true. A typical stop joint wherein molded porcelain insulators are employed and which has been extensively used is illustrated in my Patent 1,819,882 issued August 18, 1931.

By reason of the improved construction forming the subject matter of the present application, I am able to reduce the overall length of a stop joint for a given installation approximately 27% over one for the same purpose using molded porcelain insulators, its diameter by approximately 50%, and its volume, meaning thereby the cubical contents of the joint casing, by approximately four fifths.

My invention has for its object the provision of an improved stop joint for fluid filled cables which is substantially smaller, less expensive and less liable to injury than those which have heretofore been used.

For a consideration of what I believe to be novel and my invention, attention is directed to the accompanying description and the claims appended thereto.

In the accompanying drawing, which is illustrative of my invention, Fig. 1 is a view partly in longitudinal section and partly in elevation of a stop joint; Fig. 2 is a cross-section on line 2—2 of Fig. 1; Fig. 3 is a cross-section on line 3—3 of Fig. 1; Fig. 4 is a detail sectional view of a part of the construction; Fig. 5 is a perspective view of a preformed conical tube insulator; Fig. 6 is a sectional detail of one of the conductor connecting members, Fig. 7 is a detail view illustrating the electrostatic shield over the clamp that unites the connector members, and Fig. 8 is a detail view of a connector suitable for solid type cable.

Since both ends of the joint are similarly constructed, a description of one end will be sufficient. 7 indicates a hollow stranded conductor, the channel or core 8 of which is filled with liquid insulation under a pressure above that of the atmosphere. As an illustration, degasified oil may be employed as the liquid. Surrounding the conductor are numerous layers 9 of fibrous insulation applied in the factory in the form of relatively narrow tapes or ribbons. These layers are impregnated with the oil filling the channel. Surrounding the insulation and snugly fitting it is an impervious lead or equivalent sheath 10. The factory applied insulation is cut away to form small steps 11, as best shown in Fig. 4, to expose the copper or other strands of the conductor near the end thereof. The bared end of the conductor is inserted in a socket 12 formed in the connector member 13, best shown in Fig. 6. This member has a central tube 14, the outside diameter of which corresponds to the bore of the hollow conductor, a head 15, and an annular part 16 which forms the outer wall of the socket for the conductor while the tube 14 forms the inner wall. The part 16 is provided with a suitable number of small openings 17 through which string solder is introduced for the purpose of firmly uniting the conductor and connector member. The central part of the member is enlarged to form the head which has a peripheral groove 18 and one or more radial ports or passages 19 communicating therewith and with the central bore or passage of the member. The groove 18 is in effect a small annular chamber which feeds liquid to and receives it from the channels in the cone-shaped insulator as will appear later. The liquid in the channel of the conductor under operating conditions is free to flow into and through tube 14, radial ports or passages 19 and groove 18. One side of the member has a tubular extension 20, which is screw threaded internally. The bore of the tube 14 and of the extension 20 are both screw threaded to receive a small plug 21, Fig. 1, which act as a valve. The right hand end of the extension is also provided with additional screw threads to receive the larger plug 22, Fig. 1, which also acts as a seal. The purpose of these valves or plugs will be described later.

As previously indicated, both ends of the joint are alike and for that reason, two connector members 13 are provided. To unite them, two half clamps 25 and 26 are employed having internal screw threads to engage those of the extensions 20. Care should be exercised in making the joint not to distort the extensions 20 in any way, especially during the operation of uniting the strands of the conductor with the socketed parts of the connector members by soldering or compressing the parts 16. It is also important not to injure the threads on the extensions 20 because if injured, they will not properly fit the internal threads of the clamps. The half clamps are united by a suitable number of screws 27, Fig. 3, having sockets in their heads to receive suitably formed wrenches. Only two screws are shown because their positions coincide with the the section but ordinarily four or six screws will be employed. The main thing is to be able to exert sufficient pressure on the respective threaded surfaces of the parts to insure good electrical conductivity from cable to cable. The provision of the extensions 20 and the divided clamps arranged as shown also make a strong mechanical construction of reasonable axial length. The clamp fills the entire space between the ends of the cone insulators to be referred to later, except for two thin clamping nuts, and has approximately the same diameter as the small ends of the cones. Because of the necessary openings for the screws 27 which may present sharp irregular surfaces, a covering of thin metal 55 is applied over the clamp to act as an electrostatic shield. The advantage of a smooth clamp either alone or in combination with a metal shield or covering resides in the fact that a smooth practically unbroken surface is provided over which a reinforcing tape insulation may be easily and smoothly wound in continuous layers. Where irregular surfaces exist in the region of the connector members, it is impractical to use such tape windings and other and more expensive means have to be employed and which substantially enlarge the overall diameter of the joint and also increases the cost. Moreover, the use of relatively large smooth metal surfaces reduces the tendency for the concentration of high electrical stresses at any point. The reinforcing insulation 41 is desirably covered inside and out by layers of varnished silk tape 29 in the manner illustrated in Fig. 4.

As previously stated, the factory applied insulation is removed in a manner to form steps and to thereby expose the conductor. After each conductor is united with its connector member 13, as by soldering or compressing, it is necessary to reinsulate it, which means that the work must be done in a manhole underground where conditions are generally unfavorable. For this purpose, fibrous insulation 28 such as varnished cloth tape for example is employed and wrapped on layer by layer with overlapping turns. This field applied insulation covers a part of the factory applied insulation as indicated at the left hand end of Fig. 1, and also covers the part 16 of the socket of the connector member. Some kinds of insulation in common use for such purposes adversely affect the degasified oil used in the cable by contaminating it to a limited extent. Where it is necessary or desired for any reason to use such insulation, it becomes important to prevent the oil from having direct access thereto and thereby being subject to contamination. This is done by providing internal and external coverings for protecting the reinforcing wrapped on insulation 28. For this purpose, any suitable insulating material may be employed which is impervious to oil and which has no objectionable effect thereon nor the oil upon the insulation. In other words, material whose effect on the oil or other insulating liquid is neutral. For example, varnished silk tapes 29 may be applied with well overlapped turns. The inner layer is applied to the stepped portion of factory applied insulation 9 and the outer layer to the peripheral surface of the reinforcing insulation. One or more layers of these tapes may be used in each case. In this manner, the wrapped on insulation 28 is fully prevented, both on the inside and outside, from adversely affecting the oil. Where insulation is available which does not adversely affect the degasified oil in the cable, the coverings above mentioned may be omitted.

By carefully applying the insulation 28 and using a suitable gauge, it can be made to conform with a reasonable degree of accuracy to the desired radial dimensions along its axial length, but much depends upon the skill and care exercised by the workman, especially since the outer surface is of the form of a slightly tapered cone.

Instead of using molded porcelain insulators which, as previously stated, are open to numerous objections, I use for the purpose preformed insulators made of fibrous material such as paper arranged in layers or laminations and a heat hardened binder such as a phenolic condensation product. Because the insulator is in the form of a cone and has an inturned end 31 and a collar 32, certain special steps are required in its manufacture. One suitable method of procedure is as follows. A suitable form or dummy is first provided that substantially conforms to the shape and size of the finished insulator. Over the form are applied curved segmental strips of paper which have been previously coated or treated with a binder, such as a phenolic condensation product. Each strip makes one or approximately one turn about the form with its edges parallel to the ends of the form. The part of the paper forming the portion of the cone of smaller diameter is slotted and the spaces so formed are closed up when external pressure is applied. This arrangement prevents wrinkling. The inturned end is formed by bending inwardly the ends of the narrow pieces between the slots. The paper is applied to the form piece by piece so as to form layers or laminations with the joint in each layer overlapped by the next outer layer. To form the collar 32, a band of paper of the desired thickness is applied. If additional thickness is desired for the inturned end, a limited amount of additional treated paper may be applied at this point. The paper thus applied to the dummy may be temporarily held in place either by softening the binder by heat to render it sticky or by other binding means. As thus formed, the insulator conforms approximately to its final shape and size. The next step is to insert the assembly into a mold which has been carefully finished to the desired shape and dimensions. While in the mold, the assembly is subjected to heat and to heavy pressure internally and externally which has the effect of causing the assembly to conform to the proper shape for the insulator and the binder to harden and unite all of the papers into a dense, integral mass. An insulator so formed has much better dielectric strength than porcelain and for that reason the section may be made much thinner with the ultimate result of decreasing the diameter of the joint as a whole. It is tough and well adapted to withstand stresses and rough handling. In addition to the foregoing, it can be machined without difficulty, thereby permitting any or all parts thereof to be made to definite dimensions. It also avoids the use of thick heavy end flanges of large diameter which are so necessary with porcelain parts that are subjected to stresses and have to have fluid tight joints thereby decreasing the length of the joint. In general, such an insulator can and does make a reasonably close fit over the reinforcing insulation 28 and because of its strength and freedom from fracture, it can if necessary be forced longitudinally into place in the event that the insulation 28 is a trifle irregular and large in one or more spots. Since in the joint, it is necessary to ensure a free but nevertheless small passage for the oil or other fluid from the channel 8 of the conductor to the end chamber 33 of the joint casing, a number of longitudinal grooves 35 are molded or machined inside the conical insulation extending from the outer end thereof to approximately the inturned end 31. In any event, they should be in free communication with the annular groove 18 and the radial ports or passages 19 in the head portion of the connector member. The grooves 35 ensure a free passage for oil even though the cone is forced over the insulation 28 to an extent that would otherwise cause an obstruction or dam to be formed which would prevent or unduly limit the movement of oil between the chamber 33 and the channel 8 of the conductor. In the event that a reduced diameter of the cone insulator is not of paramount importance, it may be made of larger internal diameter in which case the grooves 35 may be omitted, but since any increase of diameter of the cone results in a corresponding increase of diameter of the surrounding parts and increased cost, such procedure is not generally recommended. The oil in the space or passage between the cone insulator and the reinforcing insulation is under considerable electrical stress, being in contact with the connector member. For that reason, the thickness of the oil body in the passage should be as small as possible consistent with maintaining a free passage, and because of the stresses the passage should be as long as possible without unduly increasing the length of the cone insulator to prevent leakage of the current. The joint herein illustrated is designed for a cable operating at 69,000 volts but is not necessarily limited to this or any other voltage. Changes in voltages may necessitate minor changes in construction but the arrangement will remain the same. Although the groove 18 is shown as being in the head of the connector member, it may be in the insulator and should, of course, open into the grooves 35.

The inturned end 31 of the insulator which is made of thinner section than is possible with porcelain for the same purpose is clamped between the head 15 of the connector member and a nut 36 which is screwed on the part 20 of said member, suitable packings being provided on both sides of said end to form a fluid tight seal. The nut is of substantially the same diameter as the clamp to facilitate the operation of insulating by avoiding depressions, etc.

The large or outer end of the cone insulator is secured by means of the collar 32 thereof as follows: Inside of the joint enclosing casing and forming an integral part thereof, as by soldering or brazing, is a ring 37 having an internal shoulder to receive the collar 32 of the insulator and a packing ring and also an internally threaded portion to receive the annular nut 38. In effect the ring and internally threaded portion thereof form a part of the joint casing and also form a suitably rigid structure which will not be distorted when the nut is turned to clamp the insulator. The diameter of that portion of the ring which receives the collar 32 of the insulator is slightly larger than the collar to facilitate free seating of the parts. In addition to serving as a clamping nut, it is extended in the form of a cone 39 to form a ground shield, thereby simplifying the construction by decreasing the number of parts and making it easier to assemble.

Referring now to the small valve or plug 21 and the larger valve or plug 22 both in the connector member, when the cable reaches the point of installation, it is filled with oil or other insulating liquid and the first step is to upturn the end of the cable to form a trap to prevent entrance of air, after which the cable end cap is removed and the connector member assembled in place and soldered or otherwise secured in place. A limited amount of oil is then permitted to escape through the channel 8 and radial passages 19 to flush and carry out air as by applying pressure to the oil at the far end of the cable. Before bending the cable to a horizontal position, the small plug 21 is screwed inwardly until it closes all of the radial passages 19 when all further outward flow of oil from the channel 8 is stopped. The pressure applied to the oil is then increased and maintained during the remaining operations. The cable may then be bent to a horizontal position, the factory insulation removed by steps, and the stepped part reinforced and the cone insulator 30 slipped endwise to place and clamped in position. After both cable ends have been prepared, evacuated and filled with oil through conduit 50, and just prior to uniting the extensions 20 by the clamping means, the small plug 21 is backed out by a suitable tool to uncover the radial passages 19. To prevent it from being entirely removed from the connector member, a stop means such as a ring or shoulder 40 is provided. The larger plug 22 is then tightly screwed into place as a further means of preventing any leakage of oil from one cable to the other. Having definitely closed the parts of the connector members, one with respect to the other, the next step is to apply the halves 25—26 of the clamp to carry the current from one cable to the other. After this is done, reinforcing insulation 41 is wrapped around the clamp, the electrostatic shield, provided such a shield is required by the construction of the clamp, and over a substantial portion of the cone insulators of both parts or halves of the joint.

The casing is made in several parts to facilitate the assembly. The end parts or sections 42 are wipe soldered to the cable sheaths. The intermediate sections 43 are in turn wipe soldered at 44 to the end sections, and the intermediate sections are united by the wipe soldered joint 45. The adjacent ends of the sections are telescoped for a short distance so as to afford a suitable support for the various sections. As additional supports for the outer ends of the intermediate sections, the coned ends of the ground shields 39 are shouldered or enlarged as indicated at 46. As a further means of insuring the centralizing of the casing with respect to the axis of the joint, insulating blocks 47 are provided and angularly spaced. These may be held in place by grooving the peripheral portion of each block and applying a binding band 48 thereto.

In some cases, it is important to insulate the sheath of one cable from its connected cable in order to prevent the circulation of sheath currents. This may effectively be done by the use of an insulator 49 which is secured to the adjacent separated ends of the metal parts of one of the intermediate casing sections 43. The adjacent ends of the section have numerous parallel grooves and the insulator, which is made of a compound, is molded under heat and pressure around the ends, the compound filling the grooves and being firmly anchored therein.

To admit insulating liquid to the cable and receive it therefrom, a conduit 50 is provided at each end of the casing and opening into the end chambers 33. The conduits 50 are connected to suitable reservoirs (not shown) containing the same kind of liquid as that in the channel of the cable, said reservoirs being arranged to maintain superatmospheric pressure within the cable. In order to form a firm support for each conduit 50, the ring 37 is extended beyond that required as a support for the cone insulator 30, and the conduit is screw threaded into the extension. To maintain the insulation 41 which overlies the cones 30 and the clamps fully impregnated at all times, a conduit 51 is provided which opens into the chamber 52 surrounding the parts of the joint. This conduit will usually be connected to a supply reservoir. As a general thing, it is desirable to use the same kind of liquid insulation in the casing chamber 52 that is used in the cable. In the bottom of the central part of the casing is located a drainage opening which is normally closed by a plug 53. Conduits 50 and 51 at the right hand end joint may be connected together and both supplied from the same reservoir. The conduits 50 may be connected with a conduit containing an insulating joint.

My invention has been described in connection with what are termed fluid filled cables, the conductors of which have a central channel containing a body of thin insulation which is in liquid form at all times, but it is also applicable to cables of the so-called solid type where the impregnating material such as heavy oil has a tendency especially when heated by the current flowing in the conductor to move or migrate from a portion of the cable of higher elevation to a portion of lower elevation, as for example where the cable is laid on the side of a hill or slope. Under these conditions, the migration of the heavy oil has a tendency to cause dry spots in the portion of the cable at the higher elevation and abnormally increase the pressure at the lower end or portion. When used in connection with so-called solid cable, the same general construction is followed, as shown in Fig. 8 with the exception that the connector members are made solid or plugged to produce the same effect and the tube 14, radial port 19 and valves 21 and 22 may be omitted or plugged because unnecessary. To simplify manufacture it is desirable to make the connector members initially alike and subsequently to make changes where necessary.

What I claim as new and desire to secure by Letters Patent of the United States is:

1. In a stop joint for cables, the combination of a pair of connector members, each having a socket, an extension and a head located between the socket and extension, cables having factory applied fibrous insulation thereon which is impregnated with an insulating material that tends to flow from a high to a lower point of each cable, said factory applied insulation being reduced in thickness toward the sockets to form tapered surfaces, reinforcing insulation wrapped around the ends of the cables including a portion of the factory applied insulation which remains undisturbed to form cone shaped bodies, a preformed cone shaped insulator for each cable end which encloses the head of one connector member and surrounds the reinforcing insulation, said insulator being composed of fibrous material and a hardened binder arranged to form a laminated body closely surrounding the reinforcing insulation and having an inturned end, a means for clamping the inturned end of each insulator in contact with the head of a connector member to make a fluid tight joint, a clamp uniting the extensions on the connector members which presents a smooth peripheral surface of relatively large diameter, a wrapping of tape insulation applied in contacting layers directly over the clamp and the adjacent ends of the cone shaped preformed insulators, an enclosing casing for the joint, and means located at each end of the casing forming a support for the large end of the cone insulator, said means and insulator defining with the casing independent non-communicating end chambers.

2. In a stop joint for fluid filled cables, the combination of a pair of hollow connector members, each having a socket, an extension, a head located between the socket and extension, and an open port, insulated conductors having hollow channels filled with fluid insulation, the ends of the conductors being secured in the sockets with the channels in communication with the ports, the insulation on each of the cables being reduced in thickness toward the socket to form a taper, a clamp which unites the extensions, reinforcing insulation wrapped around the ends of the cables, a cone shaped insulator for each cable end which encloses the head on one connector member and surrounds the reinforcing insulation on the cable end, said insulator being composed of fibrous material and a binder arranged to form a laminated body having an inturned end, a means for holding the inturned end of each insulator in contact with the head on a connector member to make a fluid tight joint, a wrapping of insulation directly over the clamp and portions of the adjacent ends of the cone-shaped insulator applied in contacting layers, an enclosing casing for the joint, a means located at each end of the casing forming a support for the large end of a cone insulator, the said means and insulator defining with the casing wall an end chamber which is in free communication with the channel of the conductor and the port in the connector, and conduit means through which fluid insulation may flow from and enter one of the end chambers.

3. In a stop joint for cables, the combination of a pair of hollow connector members, each having a socket, an extension, a head located between the socket and extension, and an open port in the head communicating with the interior of the member, conductors having insulation thereon impregnated with fluid insulation, the ends of the conductors being secured in the sockets, the insulation on the cables being reduced in thickness toward the sockets to form a taper, a clamp which unites the extensions and presents a smooth peripheral surface, reinforcing insulation wrapped around the ends of the cables and a portion of each of the sockets, a cone shaped insulator for each cable end which encloses the head on one connector member and covers the reinforcing insulation on the cable end, said insulator being composed of highly compressed fibrous material and a binder arranged to form a laminated body having an inturned end, a means for holding the inturned end of each insulator in contact with the head on a connector member to make a fluid tight joint, an enclosing casing for the joint, a shouldered and internally threaded ring located inside of the casing at each end thereof and sealed thereto, each of said shoulders forming a support for the large end of a cone insulator, and nuts inside of the casing each holding the end of an insulator against a shoulder, said ring and insulator defining with the casing wall a chamber which is in free communication with the channel of the conductor and the port in the connector member, and insulation surrounding the clamp.

4. In a stop joint for fluid filled cables, the combination of a pair of hollow connector members, each having a socket, an extension, a head located between the socket and the extension, and an open port in communication with the interior of the member, insulated conductors having hollow channels filled with fluid insulation, the ends of the conductors being secured in the sockets with the channels in communication with the port, the factory applied insulation on the cables being reduced in thickness toward the sockets to form a taper, a clamp which unites the extensions, reinforcing insulation wrapped over the ends of the cables and a portion of each of the sockets, a cone shaped insulator for each cable end which encloses the head on one connector member and covers the reinforcing insulation on the adjacent cable end, said insulator being composed of fibrous material and a binder arranged to form a laminated body having an inturned end, longitudinal grooves located in the inner wall of the insulator for establishing a passage for fluid between the port in the connector member and the chamber beyond the end of the insulator, a means for supporting the large end of the insulator, a chambered casing with which the grooves communicate, and a conduit for admitting fluid to and receiving it from the chamber of the casing and the grooves.

5. In a stop joint for fluid filled cables, the combination of a pair of connector members each having a socket, an extension, a head located between the socket and the extension, an open port in the head, a longitudinal central passage communicating with the port, a portion of which is screw threaded, a screw threaded valve mounted in the passage and axially movable therein for opening and closing the port, a screw threaded plug mounted in the outer end of the extension for definitely closing the outer end of the central passage, a clamp which unites said extensions and encloses the screw plugs, insulated fluid filled conductors each having a central channel, each conductor being secured in a socket with the channel in communication with the central passage and port, the factory applied insulation on the conductor being reduced in thickness toward the socket, a wrapping of tape insulation over the factory applied insulation forming a cone, a conical insulator surrounding the wrapped on insulation which is composed of compressed fibrous material and a binder, there being a passage for fluid between the two insulations which is in communication with the port in the connector member, a casing for the joint having a chamber which is in communication with the passage, means for securing the small end of the conical insulator to the head of a connector member, and means for securing the large end of the insulator to the casing.

6. In a stop joint for fluid filled cables, the combination of a connector member having a socket, a head, a central passage and outwardly opening ports which are in free communication with the passage, an insulated cable secured in the socket which has a central fluid containing channel communicating with the passage, a preformed insulator closely surrounding the insulation on the cable which is composed of compressed fibrous material and a binder, means for securing the insulator to said head, grooves in the inner wall of the preformed insulator for conveying fluid to and from the ports, an annular chamber with which the ports and the grooves are in free communication, and a casing for the joint having an end chamber with which the grooves are in communication.

7. A cable joint comprising a pair of aligned connector members each having an enlarged head midway of its length with an externally threaded extension of lesser diameter on one side of the head, a socket in the other side of the head to receive and hold the conductor of a hollow core cable, a longitudinal conduit within the member for fluid insulation, an outwardly opening port in the head communicating with the conduit, a divided internally threaded current carrying clamp, the threads of which engage those on the extensions, means for uniting the parts of the clamp about the threaded extensions, and a controllable valve means within each of the extensions and enclosed by the clamp for closing the port while the members are exposed preparatory to uniting them and also for shutting off the passage of fluid from the conduit of one member into that of another.

8. A cable joint comprising a pair of aligned connector members each having an enlarged head midway of its length with an externally threaded extension of lesser diameter on one side of the head, a socket on the other side of the head to receive and hold the conductor of a hollow core cable, a longitudinal conduit within the member containing fluid insulation and through which it is free to escape during an assembly operation of the parts of the joint, said conduit having screw threads at its end remote from the head, a screw threaded plug accessible from the outer end of each of the extensions for definitely stopping the outward passage of fluid through the extension form the hollow core of one cable conductor into that of the other, a divided internally threaded current carrying clamp, the threads of which engage the external threads on the extensions, said clamp enclosing both of the threaded plugs, and means for firmly uniting the parts of the clamp about the threaded extensions.

9. A cable joint comprising a pair of aligned connector members each having a head midway of its length with an externally threaded extension on one side of the head, a socket on the other side to receive and hold the conductor of a hollow core cable, a longitudinal conduit within the member containing fluid insulation, a port in the head extending from the conduit to the periphery thereof, and a screw threaded plug within each extension whereby the port may be opened or closed to control the outward passage of fluid therefrom, a divided internally threaded current carrying clamp, the threads of which engage the external threads on the extensions, said clamp surrounding the plugs, means for uniting the parts of the clamp about the threaded extensions, and a thin metal covering for the surfaces of the clamp acting as an electrostatic shield therefor and presenting a smooth exterior surface to receive subsequently applied insulation.

10. A stop joint for cables comprising a pair of connector members, each having a socket and an extension, one of said members having a head located between its socket and its extension, cables having conductors, the ends of which are secured in the sockets, said conductors having factory applied fibrous insulation which is impregnated with a material that tends to flow from a high to a low point of each cable, a current carrying connector uniting the extensions, a preformed insulator which encloses the head of one of said connector members and surrounds an end of one of the cables, said insulator being composed of fibrous material and a hardened binder arranged to form a laminated body, said body having an inturned inner end, means for clamping the inturned end to the head of said member to make a fluid tight joint, an enclosing casing, a ring having a shoulder which is arranged to receive the outer end of the laminated insulator and is also internally threaded, and an annular nut through which the insulator extends, said shoulder and nut co-operating to center the insulator with respect to the cable axis and also form a fluid tight seal between the interior of the insulator and the part of the casing surrounding the nut.

11. In a cable joint, the combination of a first connector member having a socket, a passage for liquid communicating with the socket, a head, a port in the head communicating with the passage, and an extension, a hollow core insulated conductor having a bare end located in the socket, a body of fluid insulation within the passage and core, a second conductor, a second connector member secured to the extension and also to the second conductor for uniting the conductors electrically and mechanically, field applied insulation surrounding the first connector, an enclosing casing for the joint having an internal shoulder, a preformed insulator closely surrounding the first connector member and the insulation thereon comprising compressed laminated fibrous material and a hardened binder, the insulator having a longitudinally extending internal groove communicating with the port in the head for conveying fluid to and from the hollow core conductor and passage, means securing one end of the insulator fluid tight to the head of the first connector member, the opposite end of the insulator opening into the casing and engaging the shoulder thereof, the insulator and casing defining a fluid containing chamber communicating with the groove, and a clamping nut holding an end of the insulator in engagement with the internal shoulder of the casing.

EUGENE D. EBY.